United States Patent [19]

Asanuma et al.

[11] Patent Number: 5,085,895

[45] Date of Patent: Feb. 4, 1992

[54] POLYOLEFIN RESIN COMPOSITION

[75] Inventors: Tadashi Asanuma; Kazuhiko Yamamoto; Junko Ohnaka, all of Osaka; Yoshiko Tokura, Wakayama, all of Japan

[73] Assignee: Mitsui Toatsu Chemicals, Inc., Tokyo, Japan

[21] Appl. No.: 555,670

[22] Filed: Jul. 18, 1990

Related U.S. Application Data

[62] Division of Ser. No. 284,605, Dec. 15, 1988, abandoned.

[30] Foreign Application Priority Data

| Dec. 16, 1987 | [JP] | Japan | 62-316023 |
| Dec. 22, 1987 | [JP] | Japan | 62-324669 |
| Dec. 22, 1987 | [JP] | Japan | 62-324671 |
| Feb. 3, 1988 | [JP] | Japan | 63-022063 |
| Feb. 16, 1988 | [JP] | Japan | 63-031790 |
| Apr. 8, 1988 | [JP] | Japan | 63-085469 |
| May 18, 1988 | [JP] | Japan | 63-119373 |
| May 24, 1988 | [JP] | Japan | 63-124958 |
| Jul. 11, 1988 | [JP] | Japan | 63-171020 |

[51] Int. Cl.$^5$ .................. B32B 9/04; C08F 30/08
[52] U.S. Cl. .................. 427/393.5; 526/279; 156/329; 428/447
[58] Field of Search .......... 526/279; 156/329; 427/393.5; 428/447

[56] References Cited

U.S. PATENT DOCUMENTS

| 2,754,237 | 7/1956 | Brooks | 156/329 |
| 3,013,915 | 12/1961 | Morgan | 156/329 |
| 3,223,686 | 12/1965 | Natta et al. | 526/169 |
| 3,577,399 | 5/1971 | Mortimer | 526/279 |
| 3,644,141 | 2/1972 | Preston | 428/378 |
| 3,644,306 | 2/1972 | Longi et al. | 526/279 |
| 4,349,603 | 9/1982 | Kameyama et al. | 428/451 |
| 4,533,602 | 8/1985 | Nakamura et al. | 428/448 |
| 4,726,869 | 2/1988 | Matsui et al. | 156/329 |

FOREIGN PATENT DOCUMENTS

| 60-206806A | 10/1985 | Japan | 526/279 |
| 62-011707A | 1/1987 | Japan | 526/279 |
| 62-011708A | 1/1987 | Japan | 526/279 |
| 63-069809A | 3/1988 | Japan | 526/279 |

Primary Examiner—Joseph L. Schofer
Assistant Examiner—Alex H. Walker
Attorney, Agent, or Firm—Burns, Doane, Swecker & Mathis

[57] ABSTRACT

The present invention relates to the use of a polyolefin resin composition comprising a random copolymer of an alkenylsilane compound and an α-olefin compound as a material for adhesion or a coating material.

30 Claims, No Drawings

POLYOLEFIN RESIN COMPOSITION

This application is a divisional of application Ser. No. 284,605, filed Dec. 15, 1988, now abandoned.

BACKGROUND OF THE INVENTION a) Field of the Invention

The present invention relates to the use of a polyolefin resin composition comprising a random copolymer of an alkenylsilane and an α-olefin as a material for adhesion. The composition of the invention is particularly advantageous for adhering a metal and a polyolefin or adhering a polymer containing polar groups and a polyolefin.

The present invention also relates to the use of such a polyolefin resin composition material as an easy coating material.

b) Description of the Related Art

It is known to employ a multi-layer structure comprising a polyolefin layered between polymers containing polar groups, such as a saponified ethylene-vinyl acetate copolymer (such as EVAL), nylon or polyester in order to obtain the beneficial properties imparted by a polyolefin, as well as the beneficial properties imparted by polymers containing polar groups, such as gas barrier properties, which cannot be achieved through the use of a polyolefin alone.

It is also known to employ a multi-layer structure comprising a polyolefin and a metal such as iron or aluminum.

However, due to incompatibility between a polyolefin and polymers containing polar groups, and bad drapeability between a polyolefin and a metal, the materials cannot be directly adhered. Thus, when such multi-layer structures are employed, an adhesive resin is inserted between the polyolefin and the polymers containing polar groups, or between the polyolefin and the metal.

A composition comprising a graft polymer of polyolefin and anhydrous maleic acid has been used as an adhesive resin in such multi-layer structures. A polyolefin is useful in various applications including exterior paint. However, a polyolefin has poor coating properties and thus, if used alone, easily peels. Thus, a composition comprising a graft polymer of polyolefin and anhydrous maleic acid is widely employed as an adhesive resin to adhere a polyolefin to the surface of a molded component or to treat the surface of a molded component by plasma. Plasma treatment requires a complicated method and special equipment is required.

It is desirable to develop a resin composition which will improve the coating properties of a polyolefin upon being mixed therewith. A graft polymer of anhydrous maleic acid and polyolefin improves the adhesiveness between a polyolefin and a polymer containing a polar group to a certain extent. However, when the graft copolymer is used to adhere a saponified ethylene-vinyl acetate copolymer and a polyolefin or a metal, poor adhesive properties result. Further, when used to adhere a polyolefin with a metal, there is a problem of corrosion of the metal.

Thus, it has been desired to produce a resin which shows better adhesiveness.

As set forth in a co-pending application entitled α-Olefin Block Copolymers And Processes for Preparing The Same, filed in the United States Patent and Trademark Office on Nov. 16, 1988, applicants discovered that an α-olefin block copolymer comprising an alkenylsilane and an α-olefin is useful as a material for adhesion.

A random copolymer of an alkenylsilane and an α-olefin polymerized in the presence of a transition metal compound and an organic compound is disclosed in U.S. Pat. No. 3,223,686. It is also disclosed in U.S. Pat. No. 3,644,306 that such a copolymer is used to obtain a crosslinkable material. However, it has not been previously known that this copolymer is useful as a material for adhesion and for easy coating materials.

SUMMARY OF THE INVENTION

The present invention advances the state of the art by providing a polyolefin resin composition useful as a material for adhesion or coating comprising a random copolymer of an alkenylsilane and an α-olefin.

It is an object of the invention to provide a material for adhesion which is capable of easy bonding.

It is a further object of the invention to provide a material for easy coating, a molded article of which is easily surface coated and which is obtained, for example, by thermoforming the random copolymer.

It is a further object of the invention to provide a material for adhesion or an easy coating material which has superior adherability and coating strength when applied between a metal and a polyolefin compound or between a polymer containing polar groups and a polyolefin.

Additional features and advantages of the invention will be set forth in the description that follows and in part will be obvious from the description, or may be learned by practice of the invention. The features and advantages of the invention may be realized and obtained by means of the instrumentalities and combinations, particularly pointed out in the appended claims.

To achieve the objects and in accordance with the purpose of the invention, as embodied and broadly described herein, the invention relates to a polyolefin resin composition comprising an α-olefin random copolymer of an alkenylsilane and an α-olefin.

The α-olefin random copolymer of this invention is excellent in adhesive and coating properties as well as in rigidity and therefore is of great industrial value.

DETAILED DESCRIPTION OF THE INVENTION

Reference will now be made to the preferred embodiments of the invention.

The preferred alkenylsilane compounds useful in the practice of the invention have the formula (I) or (II)

$$H_2C=CH-(CH_2)_n-SiH_mR_{3-m} \tag{I}$$

wherein n is 0 or an integer from 1 to 12, R is selected from the group consisting of a methyl and a phenyl radical, and m is an integer of from 1 to 3; or

$$H_2C=CH-(CH_2)_nSiH_pX_{3-p} \tag{II}$$

wherein X represents a halogen, n is 0 or an integer of from 1 to 12, and p is 0, 1, 2 or 3.

Exemplary suitable alkenylsilanes for use in the invention include vinylsilane, allylsilane, butenylsilane and pentenylsilane. Compounds formed by substituting a hydrocarbon residue such as a methyl or a phenyl group for one or two hydrogen atoms of the Si-H groups, or substituting a halogen residue for one, two or three hydrogen atoms of the Si-H groups, in each molecule of the alkenylsilane compound can also be employed.

Preferably, the α-olefin used in the practice of this invention is a $C_2$-$C_{12}$ olefin, more preferably, a $C_2$-$C_8$ olefin such as ethylene, propylene, butene-1, pentene-1, hexene-1, 2-methylpentene-1, octene-1 and a mixture of two or more of these compounds.

The random copolymer of the invention is obtained by polymerizing an alkenylsilane and an α-olefin, preferably in the presence of a catalyst.

Suitable catalysts useful in preparing the random copolymer include a catalyst system composed of a transition metal compound and an organometal compound. Exemplary suitable catalysts are also described in U.S. Pat. No. 3,223,686.

The transition metal compound is preferably a titanium halide or a vanadium halide.

The organometal compound is preferably an organoaluminum compound.

Exemplary suitable catalyst systems include a combination of a transition metal catalyst obtained by reducing titanium tetrachloride with metallic aluminum, hydrogen or an organoaluminum compound; those obtained by modifying the titanium trichloride with an electron donor and an organoaluminum compound optionally including an electron donor compound such as oxygen-containing compounds; a combination of a vanadium halide or oxy-vanadium halide and an organicaluminum compound; a combination of a transition metal catalyst obtained by carrying a titanium halide, a vanadium halide or oxy-vanadium halide on a carrier such as magnesium halide or on a carrier by treating with an electron donor and an organicaluminum compound optionally including an electron donor compound such as oxygen-containing compounds; a combination of a transition metal catalyst obtained by dissolving the reaction product of magnesium halide and an alcohol in a hydrocarbon solvent, and thereafter treating by a precipitant such as titanium tetrachloride to insolubilize the hydrocarbon solvent. Further, the titanium tetrachloride may be treated by an electron donor compound such as an ester or ether and thereafter treated by a titanium halide and an organoaluminum compound that optionally includes an electron donor compound such as an oxygen-containing compound. Exemplary suitable catalyst systems are disclosed in *Zieglar-Natta Catalysts and Polymerization* by John Boor, Jr. (Academic Press), Journal of Macromolecular Science Reviews in Macromolecular Chemistry and Physics, C24(3) 355-385 (1984), ibid. (25(1) 578-597 (1985)).

Preferably, the electron donor contains oxygen containing compounds such as ethers, esters, orthoethers, and alkoxy-silicon compounds. Further, alcohols, aldehydes and water may be used as the electron donor.

The organoaluminum compound is preferably selected from the group consisting of a trialkyl-aluminum, a dialkylaluminum halide, an alkylaluminum sesquihalide and an alkylaluminum dihalide. Preferably, the alkyl groups of these compounds are selected from the group consisting of methyl, ethyl, propyl, butyl and hexyl groups, and the halide groups are selected from the group consisting of chlorine, bromine and iodine.

Polymerization of the alkenylsilane and α-olefin is generally carried out by a solvent process in which an inert solvent is used. However, bulk polymerization or vapor-phase polymerization processes are also suitable.

Polymerization of the random copolymer may be carried out by well-known processes and conditions for polymerizing α-olefins. Generally, polymerization is conducted at a temperature of from about 0° C. to about 200° C., preferably from about 25° C. to about 150° C., under a pressure of from about atmospheric pressure to about 150 kg/cm$^2$, preferably from atmospheric pressure to about 100 kg/cm$^2$.

Preferably, the alkenylsilane is present in the random copolymer of the invention in an amount of from about 1 wt. ppm to about 30 wt. % when the copolymer of the invention is used as an adhesive material. If present in an amount greater than 30 wt. %, the alkenylsilane causes a decrease in catalyst activity. Preferably, when used as a material for easy coating, the alkenylsilane is present in an amount of from about 10 wt. ppm to about 30 wt. %.

No particular limitation is placed on the molecular weight of the copolymer and hence the molecular weight may be determined in accordance with the purpose of use.

When the random copolymer of the invention is to be used as a blend with other polyolefins, a desired molecular weight of the copolymer can be achieved by adjusting its intrinsic viscosity measured at 135° C. in a tetralin solution to not exceed 10, preferably from about 0.1 to about 5 dl/g.

For commercial purposes, it is more economical to adjust the content of the alkenylsilane to above about 1 wt. ppm for an adhesive material and above about 10 wt. ppm for an easy coating material by blending the random copolymer which contains a relatively high concentration of alkenylsilane and a polyolefin which contains no alkenylsilane.

Any polyolefin which does not contain an alkenylsilane can be employed. There is no particular limitation on the molecular weights of the polyolefin employed.

Further, a random or block copolymer of olefins can be blended with a random copolymer to produce a material for adhesion or easy coating. Preferably, a polyolefin having the same composition and molecular weight as the random copolymer of the invention is blended with the random copolymer of the invention. Polyolefins suitable for use in the invention include homopolymers, random or block copolymers and copolymers with a small amount of α-olefin of higher carbon in number.

The polyolefins are obtained by any conventional polymerization process carried out in the presence of a conventional polymerization catalyst. Polyolefins commercially obtained on the market are also suitable for use in the invention. Various additives such as an antioxidizing agent and an ultraviolet light absorber can be added to the polyolefin if necessary to achieve a desired property. Further, optionally a catalytic addition which activates the Si-H bond can be used in combination with the additives to improve the adhesive properties and the easy coating properties. Suitable addition compounds include an organic acid or its salt, an organic base, an alkoxide compound of an alkali metal or an alkali earth metal, a hydroxy compound, an oxide, a noble metal such as palladium or platinum. However, it is not necessary to use these catalytic additives.

The mixing ratio of the random copolymer which contains an alkenylsilane and the polyolefin which does not contain an alkenylsilane depends on the amount of alkenylsilane present in the random copolymer. Preferably, the amount of alkenylsilane present in the composition is from about 1 weight ppm to about 1 weight % for adhesion materials, and from about 10 weight ppm to 1 weight percent for easy coating materials.

The random copolymer may be blended with an additive such as a stabilizer.

There is no particular limitation on the procedure employed for mixing the copolymer with other polyolefins and/or additives. A conventional procedure such as premixing the mixture in a Henschel mixer homogeneously and melt-blending the resultant mixture in an extruder followed by granulation is sufficient. Mixing and melting may be carried out simultaneously by brabender or after melting, according to the desired end use, the mixture may be molded to form a sheet or film.

Specifically, the polyolefin resin composition may be employed as an adhesive for a polyolefin and a polar group-containing polymer, for example, polyamide, polyester, polyether or ethylene-vinyl alcohol copolymer, or a metal, for example, aluminum, steel sheet, soft iron sheet or galvanized iron sheet.

The polyolefin resin composition comprising a random copolymer of an alkenysilane and an $\alpha$-olefin may be used as a material for adhesion in a manner such that it is held between the layers of a polyolefin and a polar group-containing polymer to bind both layers by hot melt or extrusion amination. The layer may also be in the shape of a bottle.

It is also possible to use the random copolymer layer as an adhesive composition on a structure composed of a polyolefin or metal layer.

The random copolymer of the invention may also be utilized as a material for easy coating. When being used as a material for easy coating, the random copolymer is first formed into a desired shape and then coated. No particular restrictions are imposed on the coating to be used for this purpose. For example, urethane coatings, acrylic coatings and the like may be used.

The invention will further be clarified by the following examples, which are intended to be purely exemplary of the invention.

EXAMPLE 1

(a) Preparation of the polymerization catalyst

An oscillating mill equipped with four grinding pots which contained 9 kg of steel balls having a diameter of 12 mm and an inner volume of 4 liters were employed. In each pot, 300 g of magnesium chloride, 60 ml of tetraethoxysilane and 45 ml of $\alpha,\alpha,\alpha$-trichlorotoluene were added and ground for 40 hours in an atmosphere of nitrogen. The ground mixture thus obtained (300 g) was charged in a 5 liter flask. 1.5 liters of titanium tetrachloride and 1.5 liters of toluene were added to the ground mixture, followed by stirring at 100° C. for 30 minutes. The supernatant was removed. An additional 1.5 liters of titanium tetrachloride and 1.5 liters of toluene were added to the solid portion obtained, followed by stirring at 100° C. for 30 minutes. The resultant supernatant was removed and the solid portion was washed repeatedly with n-hexane, thereby obtaining a transition metal catalyst slurry. A part of the slurry was taken out as a sample and its titanium content wa analyzed. It was found to be 1.9 weight percent.

(b) Random Copolymerization of Vinylsilane and Propylene

To a pressure-tight glass autoclave having an inner volume of 200 ml the following were added: 40 ml of toluene, 20 mg of the above-described transition metal catalyst, 0.128 ml of diethylaluminum chloride, 0.06 ml of p-toluic acid methyl ester and 0.2 ml of triethylaluminum in an atmosphere of nitrogen. To the resultant mixture 2.0 g of vinylsilane were charged, then propylene was charged up to a pressure of 5 kg/cm², followed by polymerization at 70° C. for 2 hours. After the polymerization reaction, the polymer containing slurry was filtrated and then dried. 43 g of random copolymer powder were obtained. The intrinsic viscosity (hereinafter abbreviated as $\eta$) of the powder was 1.45 dl/g measured at 135° C. in a tetralin solution. The melting point and crystallizing temperatures were measured at maximum peak temperatures by raising or decreasing the temperature at a rate of 10° C./min. by means of a differential-thermal analysis instrument. The melting point was 156° C. and the crystallizing temperature was 118° C. The amount of polymerized vinylsilane in the random copolymer was calculated by analyzing silicon and was found to be 1.6 weight percent.

(c) Preparation of Ethylene Propylene Copolymer

Propylene and 2.5 weight percent of ethylene were polymerized in the same manner as above. The ethylene-propylene random copolymer had an $\eta$ of 1.60 dl/g; a rate of extraction residue of 91.5 percent (determined by extracting the powder by boiling n-heptene in a Soxhlet's extractor (hereinafter abbreviated as I.I.) which was given in terms of the weight percentage of the powder after the extraction to the powder before the extraction); and a melting point of 154° C.

(d) Preparation of the Composition 200 g of ethylene-propylene random copolymer were mixed with 10 g of propylene-vinylsilane random copolymer, 0.2 g of phenol type stabilizers and 0.3 g of calcium stearate. The resulting mixture was granulated to prepare a composition for adhesive materials.

(e) Adhesion Test

To determine the strength of adhesion between sheet of EVAL (Kuraray Co., Ltd., EP-F, ethylene-vinyl alcohol copolymer) having a thickness of 0.2 mm and a sheet of propylene-ethylene copolymer (obtained in section (c) above), a multi-layer structure having the following three layers was formed: sheet of ethylene-vinyl alcohol copolymer; sheet of propylene-vinylsilane random copolymer; sheet of propylene-ethylene copolymer. The sheet of propylene-vinylsilane random copolymer had a thickness of 0.1 mm. The sheets were pressed at 220° C. and 4 g/cm² for 3 minutes. The peel strength of the multi-layered structure was not less than 2 kg/cm. The peel strength was the T-type peel strength and was measured for a specimen having a width of 2.5 cm at 23° C. and a pulling rate of 100 mm/min, by using the Instron tensile testing machine.

(f) Comparison

For comparative purposes, the adhesion test was carried out on a multi-layer structure in which a sheet having the composition set forth in (d), above but which did not contain any propylene-vinylsilane random copolymer, was inserted between a sheet of EVAL and a sheet of ethylene-propylene copolymer. The sheets were peeled autogeneously and the peel strength could not be measured.

EXAMPLE 2

A polyethylene having an $\eta$ of 1.75 dl/g was obtained according to the procedure of Example 1(b) except that vinylsilane was not used and ethylene was used instead of propylene. A sheet of the composition was inserted as an adhesive layer between a sheet of polyethylene having a thickness of 0.2 mm and a sheet of EVAL having a thickness of 0.2 mm. The peel strength was not less than 2.0 kg/cm.

For comparison, an adhesion test was carried out using a sheet of the composition which did not contain vinylsilane propylene random copolymer, inserted between a sheet of polyethylene and a sheet of EVAL. The sheets peeled autogeneously and the peel strength could not be measured.

EXAMPLE 3

Example 1 was repeated except allylsilane was used instead of vinylsilane to produce an alkenyl-$\alpha$-olefin random copolymer having a melting point of 152° C., an $\eta$ of 1.28 dl/g, and an allylsilane content of 2.1 weight percent.

The peel strength was not less than 2 kg/cm.

EXAMPLE 4

Random copolymerization of ethylene and vinylsilane was carried out as follows:

(a) Preparation of Random Copolymer of Vinylsilane and Ethylene

To a pressure-tight glass autoclave having an inner volume of 200 ml the following were added: 40 ml of toluene, 50 mg of the transition metal catalyst obtained in Example 1(a), 0.128 ml of diethylaluminum chloride, 0.06 ml of p-toluic acid methyl ester and 0.20 ml of triethylaluminum in an atmosphere of nitrogen. To the resultant mixture the following were charged: 4.0 g of vinylsilane hydrogen up to a pressure of 0.2 kg/cm$^2$, ethylene up to a pressure of 1 kg/cm$^2$. Polymerization was then carried out at 70° C. for 2 hours. After the polymerization reaction, the polymer containing slurry was removed and subjected to filtration and then dried. 63 g of random copolymer powder were obtained. The $\eta$ was 1.81 dl/g, the melting point was 126° C. and the crystallizing temperature was 104° C. The amount of polymerized vinylsilane in the random copolymer was calculated by analyzing silicon and was found to be 1.3 weight percent.

(b) Preparation of Polyethylene

A polyethylene having an $\eta$ of 1.88 dl/g was obtained by a homopolymerization process.

(c) Preparation of the Composition

To 200 g of polyethylene powder were added 10 g of the ethylene-vinylsilane random copolymer, 0.2 g of phenol type stabilizers and 0.3 g of calcium stearate. The resulting mixture was granulated to prepare a composition for adhesive materials.

(d) Adhesion Test

The peel strength test was carried out in the same manner as in Example 2 and the peel strength of the sheets was not less than 2 kg/cm.

(e) Comparison

For comparison, the adhesion test was carried out in the same manner as above except a sheet of the composition which did not contain an ethylene-allylsilane copolymer was employed as the middle sheet in the multi-layer structure. The sheets peeled autogeneously and the peel strength could not be measured.

EXAMPLE 5

A resin composition was prepared by mixing and granulating 10 g obtained in Example 1(c) of the ethylene-vinylsilane random copolymer obtained in Example 4(a), 200 g of the propylene ethylene copolymer obtained in Example 1(c), and the same amounts of additives as in Example 4(c). This composition was used as an adhesion layer between a sheet of propylene ethylene copolymer obtained in Example 1(c) and a sheet of EVAL. The adhesion test was carried out in the same manner as in Example 1(e). The peel strength was not less than 2 kg/cm.

EXAMPLE 6

The random copolymerization was carried out in the same manner as in Example 4(a) except that allylsilane was used instead of vinylsilane. The random copolymer of ethylene-allylsilane, which contained 1.81 weight percent of allylsilane, having a melting point of 123° C. and an $\eta$ of 1.31 dl/g, was obtained. The composition was prepared by mixing the ethylene allylsilane random copolymer, polyethylene and additives as in Example 4(c). The peel strength was measured in the same manner as in Example 4(d) and was found to be not less than 2 kg/cm.

EXAMPLE 7

2 parts by weight of the propylene vinylsilane random copolymer obtained in Example 1(b), 97 parts by weight of polypropylene ($\eta$ was 1.65 dl/g. I.I. was 97.1%), 0.2 parts by weight of phenol type stabilizers, and 0.3 parts by weight calcium stearate were mixed in a Henschel mixer for 5 minutes, followed by granulation by a 20 mm $\phi$ extruder at 220° C. The pellets obtained were compression molded at 220° C. and a pressure of 100 kg/cm$^2$ to form a 200 $\mu$m sheet.

To determine the strength of adhesion between the sheet and aluminum, aluminum plates 10 $\mu$m thick degreased with acetone were employed in the order of aluminum plate-sheet-aluminum plate to form a multi-layer structure. The resulting formation was pressed at 230° C. under 10 kg/cm$^2$ for 10 minutes and then cooled with water to form a laminated plate. The peel strength was 1.8 kg/cm.

Comparison

The test was repeated in the same manner except that the middle sheet did not contain a random copolymer of vinylsilane and propylene. The laminated plate peeled autogeneously and the peel strength could not be measured.

EXAMPLE 8

Example 7 was repeated except the random copolymer of propylene and allylsilane obtained in Example 3 was used in place of the vinylsilane propylene copolymer. The peel strength was 1.6 kg/cm.

EXAMPLE 9

Example 7 was repeated except a galvanized iron sheet (JIS-J-3302) was used instead of an aluminum plate. The peel strength was 1.1 kg/cm.

Comparison

The test was repeated in the same manner except that a composition that did not contain a random copolymer of vinylsilane and propylene was used to form the middle sheet. The laminated sheets peeled autogeneously and the peel strength could not be measured.

EXAMPLE 10

Example 7 was repeated except that a soft iron sheet was used in place of the aluminum plate, and the sheet obtained in Example 8 was used. The peel strength was 1.7 kg/cm.

Comparison

The test was repeated except a composition that did not contain a random copolymer of vinylsilane and propylene was used for the middle sheet. The laminated sheets peeled autogeneously and the peel strength could not be measured.

EXAMPLE 11

10 g of the propylene-vinylsilane random copolymer obtained in Example 1(b), 200 g of polyethylene obtained by polymerizing ethylene using the catalyst obtained in Example 1(a), 0.2 g of phenol type stabilizers and 0.3 g of calcium stearate were mixed and then granulated to prepare a composition for easy coating materials.

Strength of Coating Test

To determine the strength of coating, the composition was further compression-molded at 220° C. and 40 kg/cm$^2$ to obtain a sheet having a thickness of 1 mm. Specimens of the sheet were separately coated with two kinds of coatings (Olestar 2182: product of Mitsui Toatsu Chemicals, Inc.) as a urethane coating and Unirock (product of Rock Paint, Inc.) as an acrylic coating by brush. The specimens were baked and dried in an air oven at 60° C. for 30 minutes. The strength of adhesion of the coated film was measured for the specimens applied with the coating according to the procedure of JIS K-5400 (the cross hatch test). The number of cross-cut residual coated films were respectively as excellent as 100 out of 100.

For comparison, the test was repeated except a composition that did not contain a random copolymer of propylene and vinylsilane was used for the composition for easy coating materials. The number of cross-cut residual coated films were respectively 5 and 10.

EXAMPLE 12

The random copolymerization was carried out in the same manner in Example 4(a) except that allylsilane was used instead of vinylsilane and the amount of hydrogen charged was 0.1 kg/cm$^2$ instead of 0.2 kg/cm$^2$. Thus, the random copolymer of ethylene and allylsilane which contained 1.7 weight percent allylsilane, having a melting point of 126° C. and an of 1.48 dl/g was obtained. The random copolymer and an ethylene-butene-1 copolymer and additives were mixed to prepare a composition. The strength of coating was repeated in the same manner as in Example 11. The number of cross-cut residual coated films were both as excellent as 100 out of 100.

For comparison, the test was repeated except a composition not containing a random copolymer of ethylene and allylsilane was used as the composition for easy coating. The number of cross-cut residual coated films were respectively 5 and 10 out of 100.

EXAMPLE 13

The composition obtained in Example 4 was used as the composition for easy coating. The test was carried out in the same manner as in Example 11. The number of cross-cut residual coated films were respectively as excellent as 100 out of 100.

For comparison, the strength of the coating test was repeated except a composition that did not contain a random copolymer of ethylene and allylsilane was used as the easy coating material. The number of cross-cut residual coated films were respectively 5 and 10.

EXAMPLE 14

The random copolymer of ethylene and allylsilane obtained in Example 12 (containing 1.7 weight percent of allylsilane, having a melting point of 126° C. and an $\eta$ of 1.48 dl/g), polypropylene (Mitsui Noblen JHH-G, Mitsui Toatsu Chemicals, Inc.) and additives were mixed to prepare a composition. The strength of coating test was repeated in the same manner as in Example 11. The number of cross-cut residual coated films were both 100 out of 100.

For comparison, the test was repeated except a random copolymer of ethylene and allylsilane was used as the easy coating material. The number of cross-cut residual coated films were respectively 5 and 5.

EXAMPLE 15

The test was repeated in the same manner as in Example 14 except that 5 g, rather than 10 g, of random copolymer of the ethylene-allylsilane compound were employed. The number of cross-cut residual coated films were respectively 85 and 90.

EXAMPLE 16

The strength of coating test was repeated in the same manner as in Example 15 except that 0.1 g of lithium ethoxide was added to the composition. The number of cross-cut residual coated films were both 100.

For comparison, the test was repeated except that a composition that did not contain a random copolymer of ethylene and allylsilane was used as the easy coating material. The number of cross-cut residual coated films were both 5.

EXAMPLE 17

Polypropylene ($\eta$ was 1.65 dl/g and I.I. was 97.1%) was obtained according to the same manner as in Example 1(b) except that vinylsilane was not added. 200 g of polypropylene, 10 g of the random copolymer of propylene and vinylsilane obtained in Example 1(b), 0.2 g of phenol type stabilizers and 0.3 g of calcium stearates were mixed and granulated to prepare a composition for easy coating. The strength of coating test was repeated in the same manner as in Example 11. The number of cross-cut residual coated films were both 100.

For comparison, the strength of coating test was repeated except that a composition that did not contain a random copolymer of ethylene and vinylsilane was used as an easy coating material. The number of cross-cut residual coated films were 5 and 10.

EXAMPLE 18

The strength of coating test was repeated in v the same manner as in Example 17 except that 5 g, rather than 10 g, of a random copolymer of propylene-allylsilane compound were employed. The number of cross-cut residual coated films were respectively 90 and 95.

EXAMPLE 19

The composition obtained in Example 18 was molded to a sheet. The sheet was subjected to a treatment in ethanol at 40° C. for one hour. The test was then repeated in the same manner as in Example 11. The number of cross-cut residual coated films were both 100. Thus, by treating multi-layer structures containing the composition of the invention with alcohol, the adhesive and coating properties of the structure are improved.

EXAMPLE 20

Preparation of Random Copolymer of Propylene and Vinyl Trichlorosilane

Random copolymerization was carried out in the same manner as in Example 1(b), except that 4.0 g of trichlorosilane instead of vinylsilane and 50 mg, rather than 20 mg of the transition metal catalyst were used. 28 g of a random copolymer of propylene and vinyltrichlorosilane, having an $\eta$ of 1.41 dl/g, a melting point of 148° C. and a crystallizing temperature of 102° C. were obtained. The amount of polymerized trichlorosilane in the random copolymer was calculated by analyzing silicon and was found to be 1.8 weight percent.

100 g of polypropylene powder ($\eta$ was 1.65 dl/g, I.I. was 97.1%), 20 g of the random copolymer of propylene and vinyltrichlorosilane, 0.9 g of phenol type stabilizers and 0.3 g of calcium stearates were mixed and granulated to prepare a composition for easy coating. The strength of coating test was repeated in the same manner as in Example 11. The number of cross-cut residual coated films were both 100.

For comparison, the test was repeated except that a composition that did not contain a random copolymer of propylene and vinyltrichlorosilane was used as the easy coating material. The number of cross-cut residual coated films were both 5.

EXAMPLE 21

The strength of coating test was repeated in the same manner as in Example 20 except that 10 g, rather than 20 g of a random copolymer of propylene and vinyltrichlorosilane were used. The number of cross-cut residual coated films were respectively 70 and 80.

EXAMPLE 22

The composition in Example 21 was molded to a sheet. The sheet was subjected to a treatment in ethanol at 40° C. for one hour. The strength of coating test was performed in the same manner as in Example 11. The number of cross-cut residual coated films were both 100. Thus, by treating a multi-layer structure containing the composition of the invention with alcohol, the adhesive and coating strength properties are improved.

For comparison, the strength of coating test was repeated except that a composition that did not contain a random copolymer of propylene and vinyltrichlorosilane was used as the composition of easy coating. The number of cross-cut residual coated films were both 5.

EXAMPLE 23

The strength of coating test was carried out in the same manner as in Example 20 except that a random copolymer of propylene and allyltrichlorosilane (containing 2.3 weight percent of allyltrichlorosilane, melting point of 135° C. and $\eta$ of 1.34 dl/g) was used in place of vinyltrichlorosilane. The number of cross-cut residual coated films were both 100.

What is claimed is:

1. A process for preparing an article having a first layer and a second layer bonded with an adhesive layer comprising applying between said first layer and said second layer a polyolefin resin composition containing a random copolymer of an α-olefin and an alkenylsilane represented by the formula (I)

$$H_2C=CH-(CH_2)_n-SiH_mR_{3-m} \quad (I)$$

wherein n is 0 or an integer of from 1 to 12, R is selected from the group consisting of a methyl and a phenyl radical, and m is an integer of from 1 to 3.

2. The process of claim 1 wherein said first layer is formed of a polyolefin and said second layer is formed of a compound selected from the group consisting of a metal and a polymer containing polar groups.

3. The process of claim 1 wherein said alkenylsilane compound is present in an amount of from about 1 weight ppm to about 30 weight percent.

4. The process of claim 1 wherein said alkenylsilane compound is selected from the group consisting of vinylsilane, allylsilane, butenylsilane and pentenylsilane.

5. The process of claim 1 wherein said α-olefin compound is a $C_2$-$C_{12}$ olefin.

6. The process of claim 5 wherein said α-olefin compound is selected from the group consisting of ethylene, propylene, butene-1, pentene-1, hexene-1, 2-methylpentene-1, octene-1 and a mixture of at least two of said compounds.

7. The process of claim 1 wherein said random copolymer is blended with at least one polyolefin.

8. The process of claim 7 wherein said random copolymer is blended with at least one homo or copolymer of an α-olefin.

9. The process of claim 7 wherein said random copolymer is blended with at least one compound selected from the group consisting of a homopolymer, a random copolymer, and a block copolymer.

10. The process of claim 7 wherein the weight percent of alkenylsilane is from about 1 weight ppm to about 1 weight percent.

11. The process of claim 7 wherein said random copolymer has an intrinsic viscosity measured at 135° C. in a tetralin solution of from about 0.1 dl/g to about 10 dl/g.

12. The process of claim 1 wherein said random copolymer has an intrinsic viscosity measured at 135° C. in a tetralin solution of from about 0.1 dl/g to about 10 dl/g.

13. The process of claim 1 wherein said polyolefin resin composition contains an additive.

14. The process of claim 13 wherein said additive is selected from the group consisting of an anti-oxidizing agent and an ultraviolet light absorber.

15. The process of claim 3 wherein said polyolefin resin composition contains an additive and a catalytic compound that activates the Si-H bond.

16. A process for preparing a coated article comprising applying a coating to an article formed from a polyolefin resin composition containing a random copolymer of an α-olefin and an alkenylsilane represented by the formula (I)

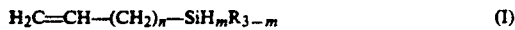

$$H_2C=CH-(CH_2)_n-SiH_mR_{3-m} \quad (I)$$

wherein n is 0 or an integer of from 1 to 12, R is selected from the group consisting of a methyl and a phenyl radical, and m is an integer of from 1 to 3.

17. The process of claim 16 wherein the weight percent of alkenylsilane compound is from about 1 weight ppm to about 30 weight percent.

18. The process of claim 17 wherein the weight percent is from about 10 weight ppm to about 30 weight percent.

19. The process of claim 16 wherein the alkenylsilane compound is selected from the group consisting of vinylsilane, allylsilane, butenylsilane and pentenylsilane.

20. The process of claim 16 wherein the α-olefin compound is a $C_2-C_{12}$ olefin.

21. The process of claim 20 wherein the α-olefin compound is selected from the group consisting of ethylene, propylene, butene-1, pentene-1, hexene-1, 2-methylpentene-1, octene-1 and a mixture of at least two of said compounds.

22. The process of claim 16 wherein the random copolymer is blended with at least one polyolefin.

23. The process of claim 22 wherein the random copolymer is blended with at least one homo or copolymer of an α-olefin.

24. The process of claim 22 wherein the random copolymer is blended with at least one compound selected from the group consisting of a homopolymer, a random copolymer, and a block copolymer.

25. The process of claim 22 wherein the weight percent of alkenylsilane is from about 1 weight ppm to about 1 weight percent.

26. The process of claim 22 wherein the random copolymer has an intrinsic viscosity measured at 135° C. in a tetralin solution of from about 0.1 dl/g to about 10 dl/g.

27. The process of claim 16 wherein the random copolymer has an intrinsic viscosity measured at 135° C. in a tetralin solution of from about 0.1 dl/g to about 10 dl/g.

28. The process of claim 16 wherein said polyolefin resin composition contains an additive.

29. The process of claim 28 wherein said additive is selected from the group consisting of an anti-oxidizing agent and an ultraviolet light absorber.

30. The process of claim 16 wherein said polyolefin resin composition contains an additive and a catalytic compound that activates the Si-H bond.

* * * * *